(12) United States Patent
Gelmetti

(10) Patent No.: US 8,235,211 B2
(45) Date of Patent: Aug. 7, 2012

(54) RETAINER FOR WELDING WIRE CONTAINER, HAVING FINGERS AND HALF-MOON SHAPED HOLDING TABS

(75) Inventor: Carlo Gelmetti, Lazise (IT)

(73) Assignee: Sidergas SpA (IT)

( * ) Notice: Subject to any disclaimer, the term of this patent is extended or adjusted under 35 U.S.C. 154(b) by 19 days.

(21) Appl. No.: 12/917,320

(22) Filed: Nov. 1, 2010

(65) Prior Publication Data
US 2011/0094911 A1    Apr. 28, 2011

(51) Int. Cl.
B65D 85/00    (2006.01)
(52) U.S. Cl. .............. 206/408; 242/128; 242/423.1
(58) Field of Classification Search ........... 206/408; 242/156.1, 128, 423.1; 229/82, 77
See application file for complete search history.

(56) References Cited

U.S. PATENT DOCUMENTS

| | | | |
|---|---|---|---|
| 318,062 A | 5/1885 | Warren | |
| 532,565 A | 1/1895 | Kilmer | |
| 617,353 A | 1/1899 | Redmond | |
| 627,722 A | 6/1899 | Edwards | |
| 932,808 A | 8/1909 | Pelton | |
| 1,640,368 A | 8/1927 | Obetz | |
| 1,907,051 A | 5/1933 | Emery | |
| 2,059,462 A | 11/1936 | Jungmann | |
| 2,407,746 A | 9/1946 | Johnson | |
| 2,713,938 A | 7/1955 | Snyder | |
| 2,724,538 A | 11/1955 | Schweich | |
| 2,838,922 A | 6/1958 | Gift ............................. 66/125 R |
| 2,849,195 A | 8/1958 | Richardson | |
| 2,864,565 A | 12/1958 | Whearly ....................... 242/128 |
| 2,869,719 A | 1/1959 | Hubbard | |
| 2,880,305 A | 3/1959 | Baird | |
| 2,929,576 A | 3/1960 | Henning | |
| 2,966,258 A | 12/1960 | Krafft | |
| 2,974,850 A | 3/1961 | Mayer | |
| 3,185,185 A | 5/1965 | Pfund | |
| 3,244,347 A | 4/1966 | Jenk | |
| 3,463,416 A | 8/1969 | Quenot ....................... 242/396.9 |
| 3,478,435 A | 11/1969 | Cook | |
| 3,491,876 A | 1/1970 | Zecchin | |
| 3,512,635 A | 5/1970 | Lang | |
| 3,565,129 A | 2/1971 | Field | |
| 3,567,900 A | 3/1971 | Nelson | |

(Continued)

FOREIGN PATENT DOCUMENTS

CN    1626423    6/2005

(Continued)

OTHER PUBLICATIONS

European Search Report, Appln. No. 10014216.5-1256 (8 pgs) dated Apr. 14, 2011.

(Continued)

*Primary Examiner* — David Fidei
*Assistant Examiner* — Raven Collins
(74) *Attorney, Agent, or Firm* — Hayes Soloway P.C.

(57) ABSTRACT

A retainer for a welding wire container has a base element and at least one upper element which rests on the base element. The base element has a central opening for allowing the welding wire to pass through, and at least two guiding openings through which holding fingers extend. The holding fingers are part of the upper element and are made from a flexible material.

39 Claims, 9 Drawing Sheets

U.S. PATENT DOCUMENTS

| | | | |
|---|---|---|---|
| 3,576,966 | A | 5/1971 | Sullivan |
| 3,595,277 | A | 7/1971 | Lefever |
| 3,648,920 | A | 3/1972 | Stump |
| 3,724,249 | A | 4/1973 | Asbeck et al. |
| 3,729,092 | A | 4/1973 | Marcell |
| 3,799,215 | A | 3/1974 | Willems |
| 3,815,842 | A | 6/1974 | Scrogin ............... 242/423.1 |
| 4,044,583 | A | 8/1977 | Kinney, Jr. |
| 4,074,105 | A | 2/1978 | Minehisa et al. |
| 4,102,483 | A | 7/1978 | Ueyama et al. |
| 4,172,375 | A | 10/1979 | Rushforth et al. |
| 4,188,526 | A | 2/1980 | Asano |
| 4,222,535 | A | 9/1980 | Hosbein ................. 242/128 |
| 4,254,322 | A | 3/1981 | Asano |
| 4,293,103 | A | 10/1981 | Tsukamoto |
| 4,464,919 | A | 8/1984 | Labbe |
| 4,546,631 | A | 10/1985 | Eisinger |
| 4,582,198 | A | 4/1986 | Ditton |
| 4,585,487 | A | 4/1986 | Destree et al. |
| 4,623,063 | A | 11/1986 | Balkin |
| 4,869,367 | A * | 9/1989 | Kawasaki et al. .......... 206/409 |
| 4,891,493 | A | 1/1990 | Sato et al. |
| 4,949,567 | A | 8/1990 | Corbin |
| 5,078,269 | A | 1/1992 | Dekko et al. |
| 5,109,983 | A | 5/1992 | Malone et al. |
| 5,205,412 | A | 4/1993 | Krieg |
| 5,227,314 | A | 7/1993 | Brown et al. |
| 5,261,625 | A | 11/1993 | Lanoue ................ 242/129.8 |
| 5,277,314 | A | 1/1994 | Cooper et al. ............. 206/398 |
| 5,314,111 | A | 5/1994 | Takaku et al. |
| 5,372,269 | A | 12/1994 | Sutton et al. |
| 5,452,841 | A | 9/1995 | Sibata et al. |
| 5,485,968 | A | 1/1996 | Fujioka ................. 242/125.2 |
| 5,494,160 | A | 2/1996 | Gelmetti |
| 5,553,810 | A | 9/1996 | Bobeczko |
| 5,586,733 | A | 12/1996 | Miura et al. ............ 242/125.2 |
| 5,590,848 | A | 1/1997 | Shore et al. |
| 5,692,700 | A | 12/1997 | Bobeczko |
| 5,739,704 | A | 4/1998 | Clark |
| 5,746,380 | A | 5/1998 | Chung |
| 5,816,466 | A | 10/1998 | Seufer |
| 5,819,934 | A | 10/1998 | Cooper |
| 5,845,862 | A | 12/1998 | Cipriani ................ 242/423.1 |
| 5,865,051 | A | 2/1999 | Otzen et al. |
| 5,931,408 | A | 8/1999 | Ishii et al. ............... 242/580 |
| 5,971,308 | A | 10/1999 | Boulton |
| 6,019,303 | A | 2/2000 | Cooper |
| 6,301,944 | B1 | 10/2001 | Offer |
| 6,322,016 | B1 | 11/2001 | Jacobsson et al. |
| 6,340,522 | B1 | 1/2002 | Burke et al. |
| 6,425,549 | B1 | 7/2002 | Bae et al. ............... 242/580 |
| 6,464,077 | B1 | 10/2002 | Liu |
| 6,547,176 | B1 | 4/2003 | Blain et al. .............. 242/423.1 |
| 6,648,141 | B2 | 11/2003 | Land |
| 6,708,864 | B2 | 3/2004 | Ferguson, III et al. |
| 6,745,899 | B1 | 6/2004 | Barton |
| 6,821,454 | B2 | 11/2004 | Visca et al. |
| 7,004,318 | B2 | 2/2006 | Barton ................. 206/409 |
| 7,152,735 | B2 | 12/2006 | Dragoo et al. |
| 7,178,755 | B2 | 2/2007 | Hsu et al. .............. 242/423.1 |
| 7,220,942 | B2 | 5/2007 | Barton et al. |
| 7,950,523 | B2 | 5/2011 | Gelmetti ................ 206/408 |
| 2002/0003014 | A1 | 1/2002 | Homma |
| 2002/0014477 | A1 | 2/2002 | Lee et al. |
| 2004/0020041 | A1 | 2/2004 | Ferguson, III et al. |
| 2004/0155090 | A1 | 8/2004 | B.-Jensen |

FOREIGN PATENT DOCUMENTS

| | | |
|---|---|---|
| DE | 1011840 B | 7/1957 |
| DE | 1082215 | 11/1957 |
| DE | 2122958 | 11/1972 |
| DE | 2202177 | 7/1973 |
| EP | 0519424 A1 | 12/1992 |
| EP | 0686439 A1 | 12/1995 |
| EP | 1057751 A1 | 12/2000 |
| EP | 1 295 813 | 3/2003 |
| EP | 2 168 706 | 3/2010 |
| FR | 1215111 | 4/1960 |
| FR | 2055181 | 5/1971 |
| FR | 2595674 | 3/1988 |
| GB | 880502 | 10/1961 |
| GB | 1168928 | 10/1969 |
| GB | 1229913 | 4/1971 |
| GB | 2059462 | 4/1981 |
| JP | 49-13065 | 2/1974 |
| JP | 54-043856 | 4/1979 |
| JP | 55-156694 | 12/1980 |
| JP | 56-023376 | 3/1981 |
| JP | 57-102471 | 6/1982 |
| JP | 58-035068 | 3/1983 |
| JP | 58-70384 | 5/1983 |
| JP | 59-197386 | 11/1984 |
| JP | 59-229287 | 12/1984 |
| JP | 59-232669 | 12/1984 |
| JP | 60-021181 | 2/1985 |
| JP | 60-032281 | 2/1985 |
| JP | 60-184422 | 9/1985 |
| JP | 60-223664 | 11/1985 |
| JP | 61-293674 | 12/1986 |
| JP | 62-009774 | 1/1987 |
| JP | 62-111872 | 5/1987 |
| JP | 62-287055 | 12/1987 |
| JP | 63-147781 | 6/1988 |
| JP | 1-240222 | 9/1989 |
| JP | 03264169 A | 11/1991 |
| JP | 04-133973 | 5/1992 |
| JP | 4-274875 | 9/1992 |
| JP | 08-150492 | 6/1996 |
| JP | 08-267274 | 10/1996 |
| JP | 2000-225468 | 8/2000 |
| JP | 2000-263239 | 9/2000 |
| JP | 2001-26375 | 1/2001 |
| JP | 2001-150187 | 6/2001 |
| JP | 2004-025242 | 1/2004 |
| JP | 2004-025243 | 1/2004 |
| SU | 793678 | 1/1981 |
| SU | 1412830 | 7/1988 |
| WO | WO 8810230 | 12/1988 |
| WO | WO 94-00493 | 1/1994 |
| WO | WO 94-19258 | 9/1994 |
| WO | WO 00-50197 | 8/2000 |
| WO | W 03/106096 | 12/2003 |
| WO | WO 03-106096 A1 | 12/2003 |
| WO | WO 2007112972 * | 3/2007 |
| WO | WO 2007/112972 | 10/2007 |

OTHER PUBLICATIONS

Official Action dated Apr. 12, 2012 issued in U.S. Appl. No. 12/545,720 (15 pgs).

Official Action dated Feb. 2, 2012 issued in parent U.S. Appl. No. 12/545,720 {7 pgs).

* cited by examiner

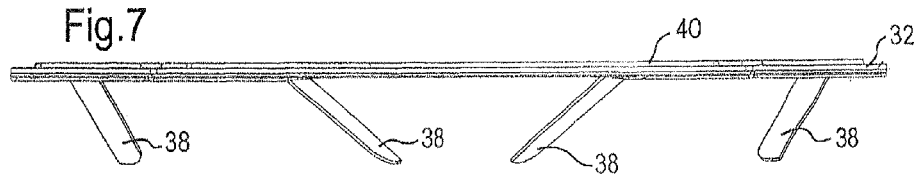
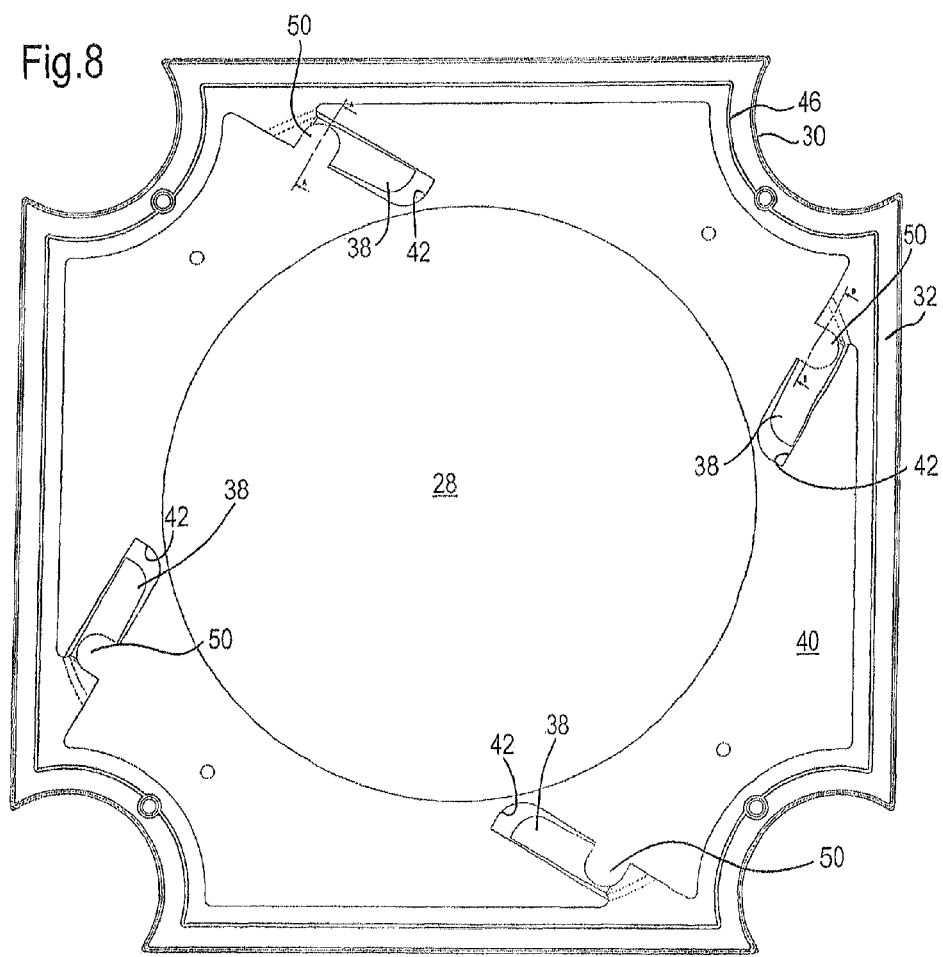

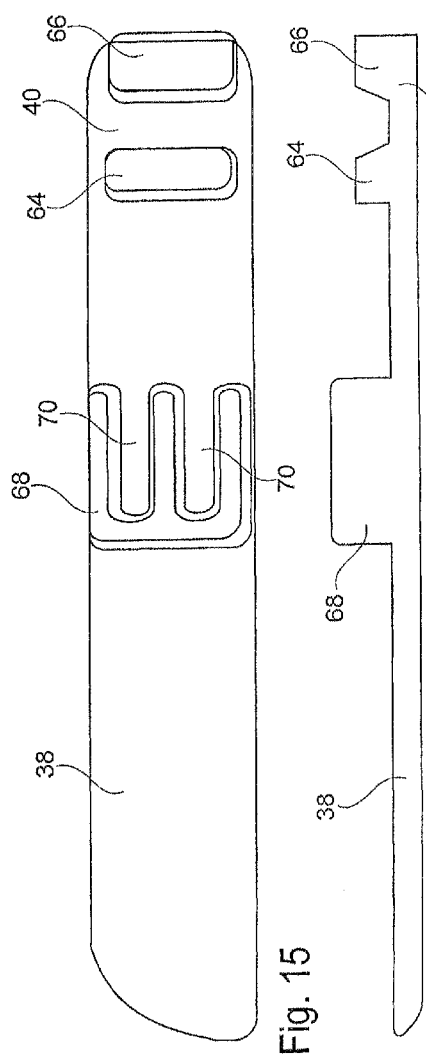
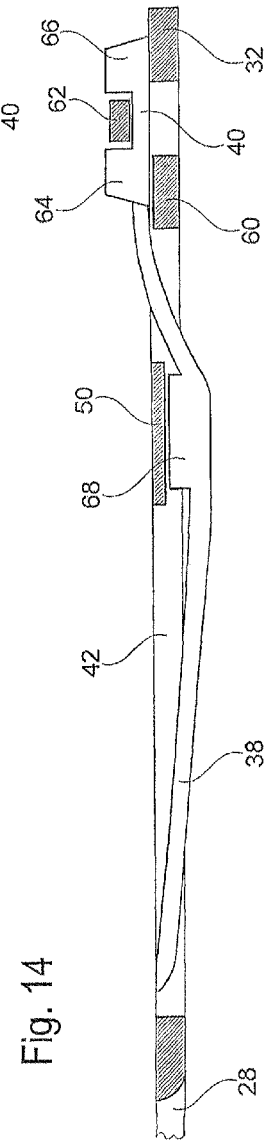
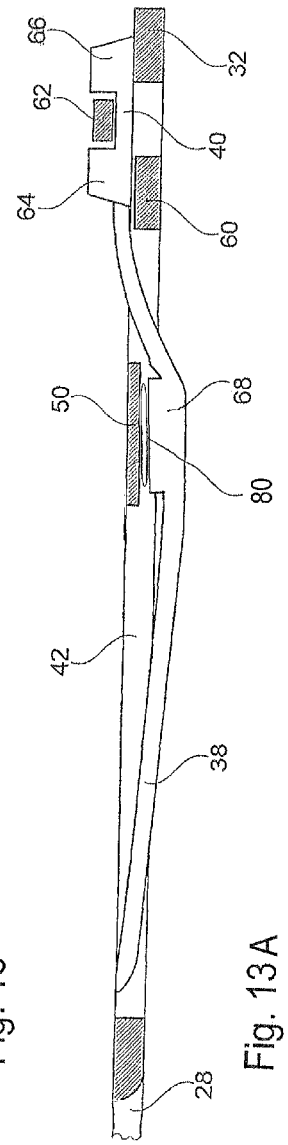
Fig. 15
Fig. 14
Fig. 13
Fig. 13A

RETAINER FOR WELDING WIRE CONTAINER, HAVING FINGERS AND HALF-MOON SHAPED HOLDING TABS

BACKGROUND OF THE INVENTION

In the welding automation processes, the use of bulk containers with larger quantities of welding wire is increasingly popular since a reduction of welding wire spool changes contributes to reduce the downtime and increases the productivity and cost savings.

However, the welding wire being paid out from the container could be affected by feeding problems and tangles which would compromise the savings offered by the lesser number of spool changes.

For the control of the strands of welding wire being paid out from the container many systems have been adopted, some represented by a single element, some with more elements interacting with one another, and some made of different materials but all the solutions adopted. Examples can be found in EP 1 295 813 A2, JP 2001 026375, U.S. Pat. Nos. 5,845,862, 6,547,176, 5,277,314, 5,746,380 and 7,004,318. Even those retainers which are floating with the wire do usually not interact dynamically with the variables of welding wire coils being wound by different machines, with different adjustments, with varying sizes of welding wire and varying dimensions of the containers. The coil of wire is sometimes offset from the center of the pack and the thickness of the coil varies depending on the machine adjustment and the wire diameter.

WO 2007/112972 teaches of a combined retainer formed by a base element with openings that accommodate the holding fingers of an upper element, the holding fingers being inserted into the openings of the base element and are designed for grabbing the wire before it falls into the center of the pack. In fact most tangling is caused by strands of wire that could fall into the center of the container out of the control of the retainer, and would knot as a consequence of bad adjustment of the wire feeder rolls or tangle after catching against the conical or cylindrical core member often used in the packs.

A problem with WO 2007/112972 is represented by the variable of the coil width which is rarely consistent for a number of reasons, in particular machine adjustment, winding pattern changing with changing of wire diameter, and wire strands settling down into the container as a consequence of vibrations during handling and transport. One additional problem with WO 2007/112972 is that both the base and the upper element are made with rigid material, and the holding fingers, depending on their placement could deform the wire when they come in contact with the strand being paid from the container.

Also, if the welding wire stops shortly before the holding finger, the holding finger will oppose more resistance when the touch the wire right after the welding operation is resumed.

The object of the present invention is to provide a retainer which perfectly holds the welding wire in its proper position, even if the welding wire coil settles during transportation and for varying diameters of the welding wire coil.

BRIEF DESCRIPTION OF THE INVENTION

For this purpose, the invention provides a retainer for a welding wire coil, which retainer has a base element and at least one upper element which rests on the base element. The base element has a central opening for allowing the welding wire to pass through, and at least two guiding openings through which holding fingers extend. The holding fingers are part of the upper element and are made from a flexible material.

Preferably, four guiding openings are provided which are evenly spaced in a peripheral direction. This number of openings has proven sufficient for controlling the wire under a plurality of different conditions.

Preferably, the length of the guiding opening is slightly larger than the length of the holding finger so that the free end of the holding finger can dip into the guiding opening. This ensures that the free end of the holding fingers does not obstruct withdrawal of the welding wire through the central opening.

According to a preferred embodiment, pressing parts are provided which act on the holding fingers so as to bend them downwardly. The pressing parts exert a downwardly acting force which adds to the force resulting from the flexibility of the holding fingers, thereby ensuring that the holding fingers maintain contact with the upper portion of the welding wire coil.

Preferably, the pressing parts are formed integrally with the base element. This reduces manufacturing expenses.

According to an advantageous embodiment, each of the holding fingers is provided with a projecting reinforcement which contacts an associated one of the pressing parts, the reinforcement being arranged between the free end of the holding finger and the upper element. The projecting reinforcement increases the displacement which the pressing part exerts on the holding finger, resulting in the holding finger being pressed reliably downwardly.

According to an embodiment of the invention, the upper element is made from a flexible material, the holding fingers being formed integrally with the upper element. This avoids additional steps for mounting the holding fingers to the upper element.

According to a preferred embodiment, a plurality of separate upper elements is provided, each of the holding fingers being integrally formed with one of the upper elements. This results in the upper elements each being very small so that less material is required. Accordingly, the elements formed from the upper element together with the holding finger can be produced from a high quality rubber material without significantly increasing the entire manufacturing costs.

Preferably, each of the upper elements is clamped to the base element. This allows mounting the holding fingers in a simple but reliable manner.

For clamping the upper elements to the base element, it is preferably provided that each guiding opening features two holding ribs which extend transversely to the longitudinal direction of the guiding opening. This allows to insert the upper element into the space between the holding ribs such that the upper element is reliably held in place.

In order to prevent that the upper element together with the holding finger becomes detached from the base element, each of the upper elements preferably has two positioning blocks which cooperate with at least one of the holding ribs. The positioning blocks form a simply but effective means for holding the upper elements in place despite the frequent bending movements which occur during withdrawal of the welding wire.

The invention further provides a container for welding wire, having a body, a welding wire coil contained in the body, and a retainer which sits on top of the welding wire coil so as to descend freely when the welding wire is being consumed, the retainer having a base element and at least one upper element which rests on the base element, the base element having a central opening for allowing the welding wire to pass through, and at least two guiding openings through which holding fingers extend, the holding fingers being part of the upper element and being made from a flexible material, the holding fingers interacting with the welding wire coil so as to control pay-out of the welding wire. The elastic holding fingers stay in contact with the upper turns of the welding wire so as to prevent them from falling into the interior of the coil and from entangling.

BRIEF DESCRIPTION OF THE DRAWINGS

Further features and advantages of the invention will be apparent from the following description of the embodiments and the attached drawings to which reference is made and in which:

FIG. 7 shows a side view of a retainer according to a first embodiment of the invention, FIG. 8 shows the retainer of FIG. 7 in a top view, FIG. 9 shows a cross section along line A-A of FIG. 8 at an enlarged scale, FIG. 10 shows a cross section along line B-B of FIG. 8 at an enlarged scale, FIG. 13 shows a schematic cross section through the retainer according to the second embodiment along line XIII-XIII of FIG. 11, FIG. 13A is similar to FIG. 13, and shows a variant thereof, FIG. 14 shows an upper element with holding finger used in the retainer according to the second embodiment, and FIG. 15 shows the upper element in a top view.

DETAILED DESCRIPTION OF THE INVENTION

Figure 1:
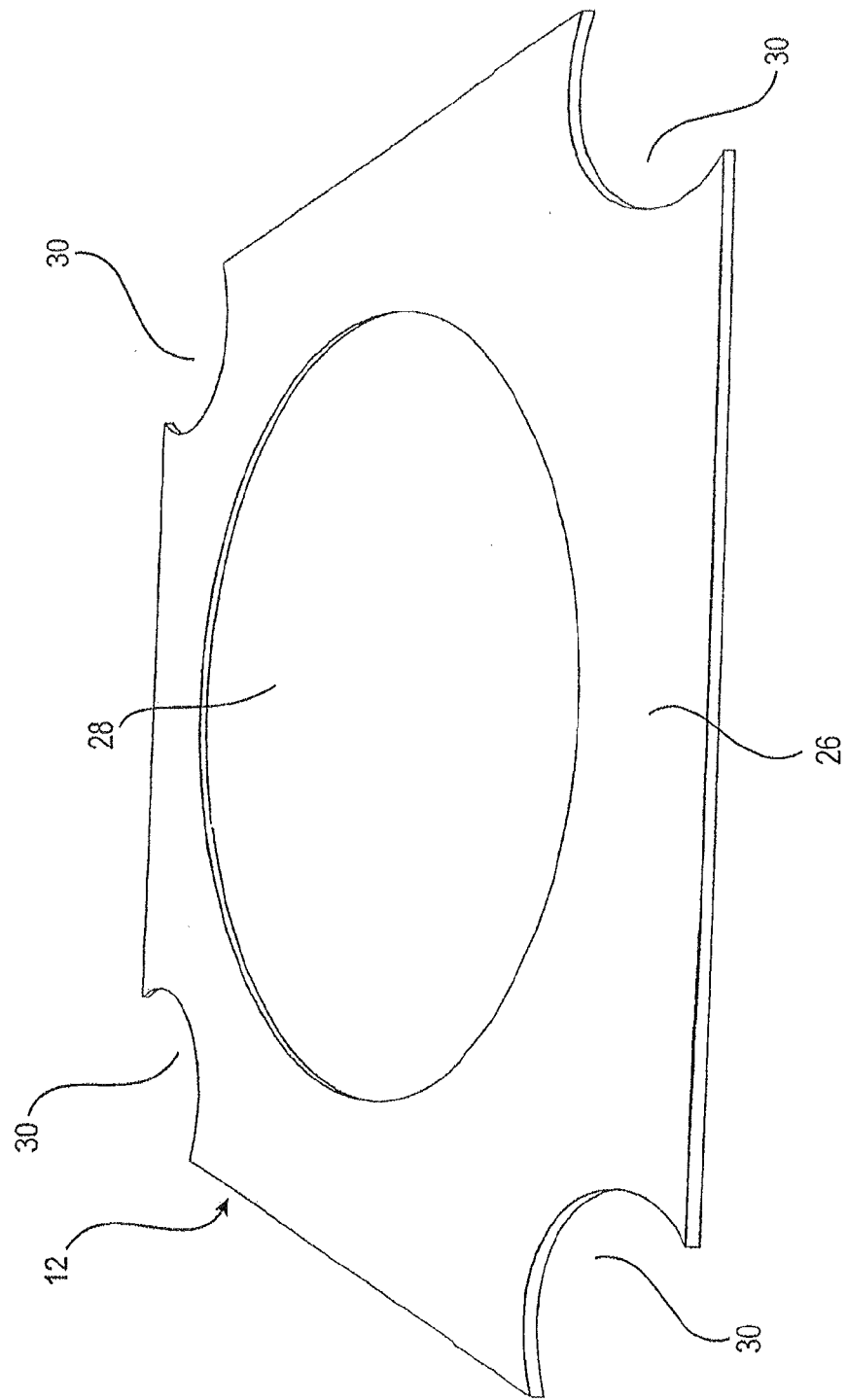
FIG. 1 shows a schematic, perspective view of a welding wire retainer according to the prior art.
Figure 2:
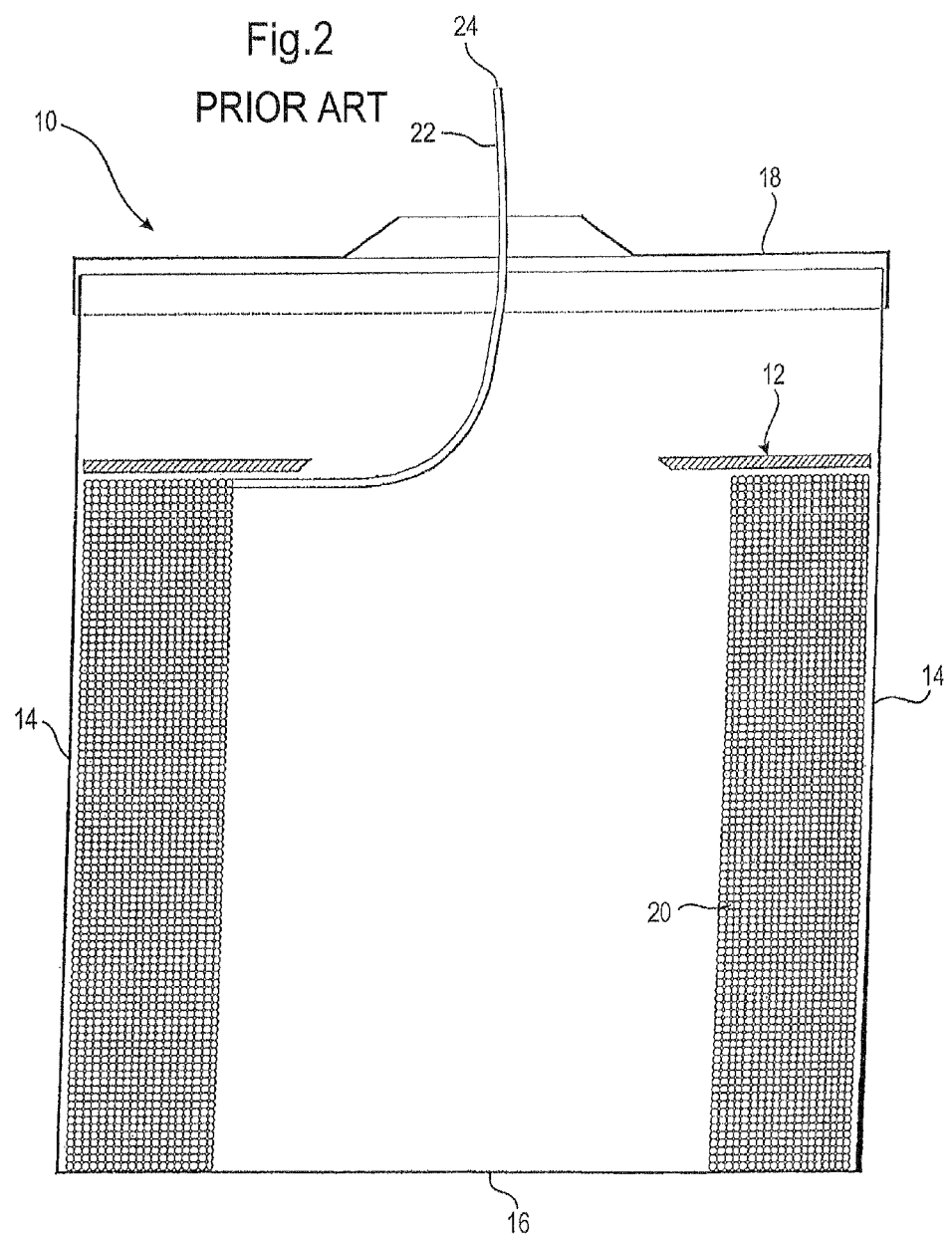
FIG. 2 shows a side view of a welding wire container with the retainer of FIG. 1 in an initial condition.
Figure 3:
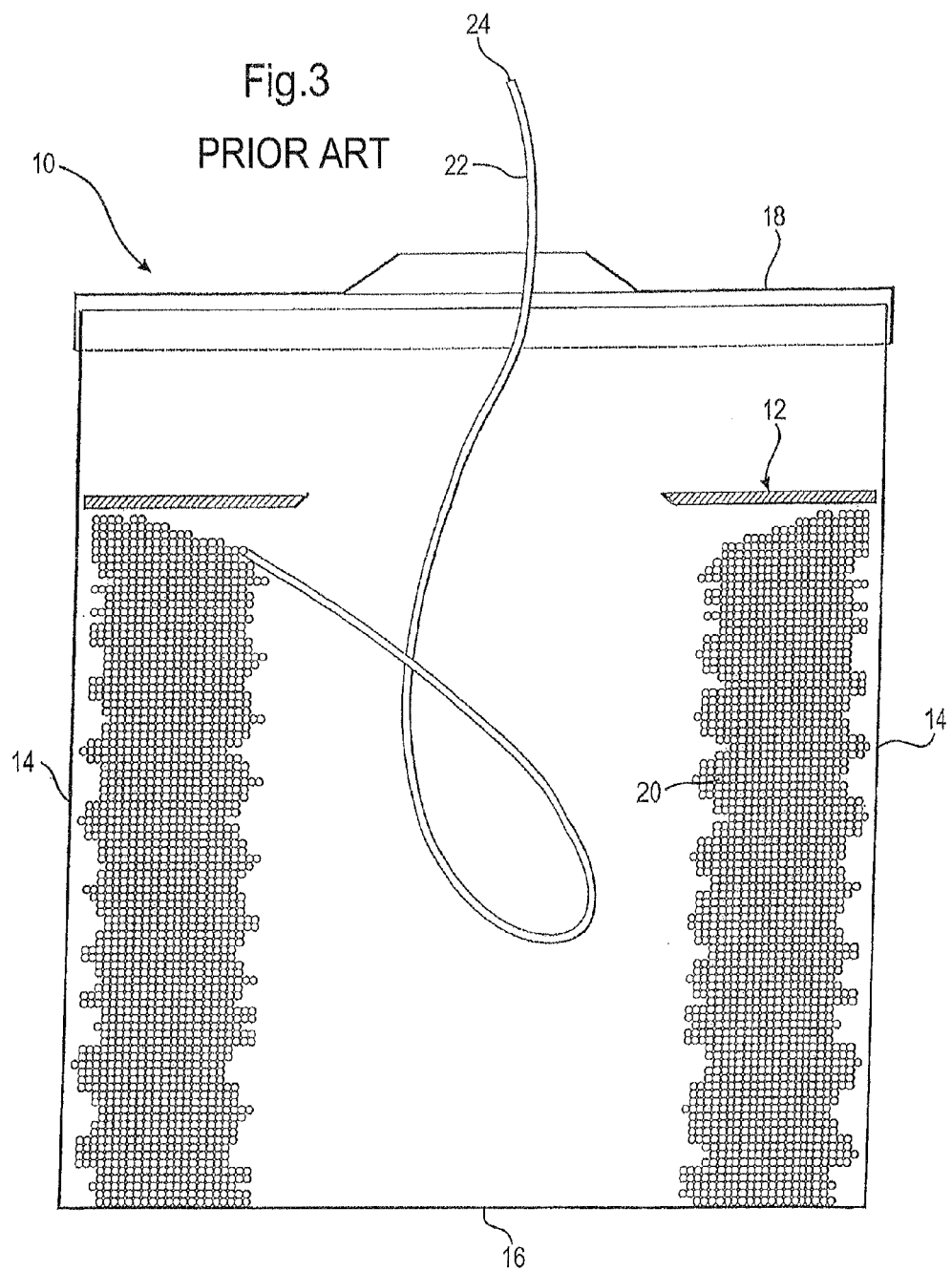
FIG. 3 shows a side view of a welding wire container with the retainer of FIG. 1 in a second condition.

A welding wire container 10 with a welding wire retainer 12 as known from the prior art is shown in FIGS. 1 to 3. The container 10 has a rectangular cross section, side walls 14 (two side walls are shown), a bottom 16 and a lid 18.

In the interior of the container 10, a welding wire coil 20 is accommodated. The welding wire coil 20 consists of a certain amount of welding wire 22 which is coiled so as to form a hollow body with a ring-shaped cross section. The beginning of the welding wire 22 is designated with reference number 24, and the end portion of the welding wire 22 can be fixed to the bottom 16 (not shown).

On the upper side of the welding wire coil 20, the retainer 12 is provided. The retainer 12 has a plate-like body 26 (please see FIG. 1) with a central opening 28 and one recess 30 in each corner to receive reinforcement elements (not shown), which are arranged in the corners of the container 10 to increase the stability of the container 10.

The retainer 12 lies on the upper side of the welding wire coil 20, the retainer 12 being always parallel to the lid 18.

During transportation of the container 10, vibrations might cause the welding wire 22 to settle and sag inwardly. Accordingly, the top surface of the welding wire coil 20 is no longer flat and level but has an upper surface which represents a portion of a cone with the inner portion of the upper coil surface being at a lower level than its outer portion. Then, the retainer 12 can not adapt on the top surface of the welding wire coil 20 and can not contact the entire upper surface of the welding wire coil 20. Therefore, the welding wire 22 is not held in its proper position by the retainer 12 and can entangle.

Figure 4:
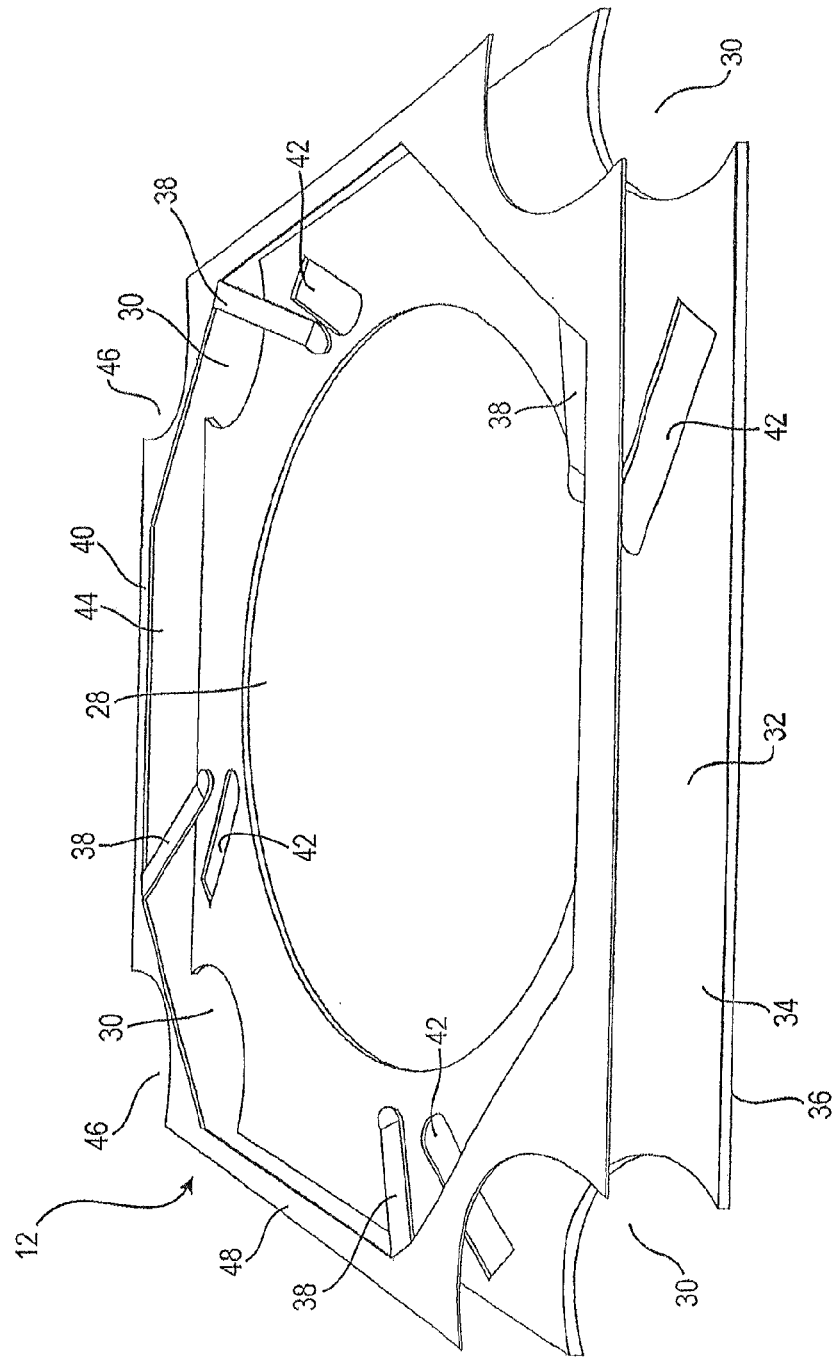
FIG. 4 shows a perspective view of another retainer according to the prior art.
Figure 5:
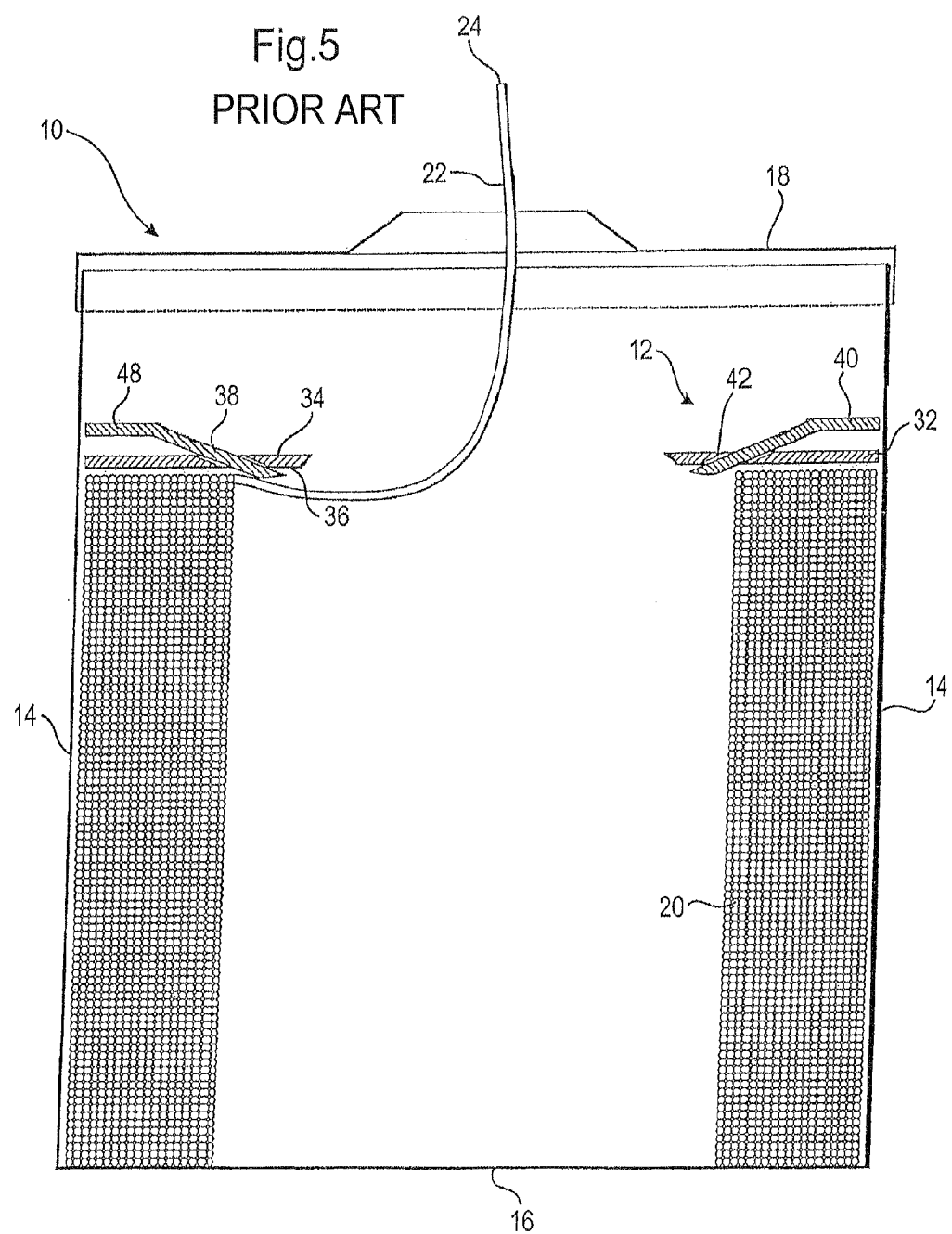
FIG. 5 shows a side view of a welding wire container with the retainer of FIG. 4 in an initial condition.
Figure 6:
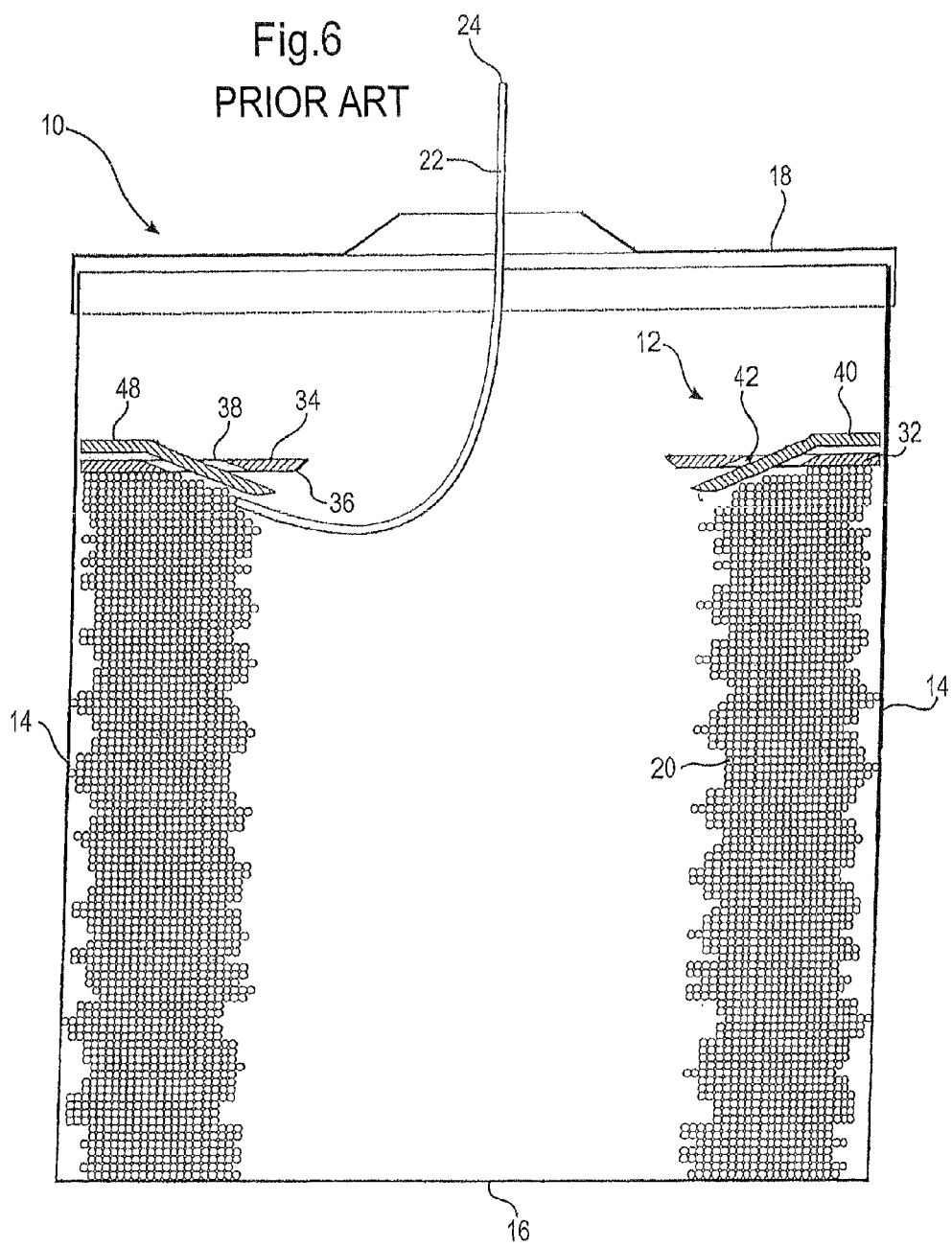
FIG. 6 shows a side view of a welding wire container with the retainer of FIG. 4 in a second condition.

In FIGS. 4 to 6, a retainer as known from WO 2007/112972 is shown. The retainer 12 has a plate-like base element 32 with a central opening 28 and four recesses 30 for receiving not shown reinforcement elements. The reinforcement elements are arranged in the corners of the container 10 to increase the stability of the container 10. The base element 32 comprises an upper surface 34 and a lower surface 36. The lower surface 36 can engage the top surface of the welding wire coil 20.

The retainer 12 has four holding fingers 38 extending downwardly beyond the lower surface 36 of the retainer 12 to engage the welding wire coil 20 and hold the welding wire 22 in its proper position as to prevent entangling of the welding wire 22. The holding fingers 38 extend in a direction which is oblique with respect to the plane in which the base element 32 lies. In particular, the holding fingers 38 reach to a point in the interior of the welding wire container 10 which is at a lower level than the base element 32. Of course, the number of holding fingers can vary so that more or less than four holding fingers can be arranged.

The retainer 12 has two parts, namely the base element 32 which sits on the upper surface of the welding wire coil 20, and an upper element 40, the upper element 40 being arranged on top of the base element 32.

The base element 32 has four openings 42, the holding fingers 38 being arranged at positions corresponding to the openings 42 of the base element 32 so that each holding finger 28 extends through one of the openings 42. The holding fingers 38 are part of the upper element 40.

Upper element 40 is frame-like and has a polygonal central opening 44 as well as four recesses 46, one recess 46 being positioned in a corner for receiving the reinforcement elements (not shown).

FIG. 5 shows the welding wire coil 20 in its initial condition in which the top surface of the coil 20 is flat and level. Here, there is a surface contact between the flat base element 32 of the retainer 12 and the top surface of the coil 20. The upper element 40 of the retainer 12, in particular its frame-like portion 48, is held spaced apart from the base element 32 as the holding fingers 38, with their inner ends, lie on top of the welding wire coil 20. Especially, the holding fingers 38 lie on the inner portion of the coil 20. The upper element 40 which is arranged on top of the base element 32 rests there due to its own weight. No additional biasing means are provided. The basic retaining effect is provided by the base element 32 of the retainer 12 which contacts the top surface of the welding wire coil 20. Additional retaining effect is provided by the four holding fingers 38 which assist in holding the respective upper welding wire 22 at its correct position.

FIG. 6 shows the welding wire coil 20 in a second condition in which the welding wire 22 has sagged inwardly. The surface of the welding wire coil 20 is no longer flat and level but has an upper surface which represents a portion of a cone with the inner portion of the coil 20 being at a lower level as its outer portion. The upper element 40 has moved downwardly with respect to the base element 32 under its own weight because the holding fingers 38 are still in contact with the top surface of the welding wire coil 20, especially the inner portion of the coil 20, and the inner portion is in this condition at a lower level than in its initial condition and oblique with respect to the plane in which the base element 32 lies.

The base element 32 basically serves for retaining the welding wire 22 in the radially outward portions of the welding wire coil 20 while the holding fingers 38 of the upper element 40 retain the welding wire 22 at the four locations where the holding fingers 38 are provided.

A retainer according to a first embodiment of the invention is shown in FIGS. 7 to 10. For the features known from the embodiment of FIGS. 4 to 6, the same reference numerals are used, are reference is made to the above explanations.

The most significant difference between the first embodiment of the invention and the embodiment shown in FIGS. 4 to 6 is that in the first embodiment of the invention, the holding fingers 38 provided on the upper element 32 are flexible and elastic. In other words, they have spring-like properties so that they tend to return into their original position when they are subjected to a load and are deflected. The resiliency of the holding fingers is due to the properties of the material they are made from. Preferably, an elastic plastic material is used. As an alternative, rubber could be used.

The base element can be rigid or flexible but this will have little impact on the actual performance of the retainer. The upper element immediately in contact with the base must be made of flexible material like rubber silicon or cloth. The yieldingness of the upper element together with the flexibility and elasticity of the holding fingers results in a strong interaction between the base element of the retainer and the upper retainer element.

The holding fingers can have various shapes and do not necessarily have to be attached or molded together with the upper element. They could be formed separately and attached to the upper element later.

Another difference between the first embodiment of the invention and the embodiment according to FIGS. 4 to 6 is that in the subject embodiment, base element 32 is provided with pressing parts 50 which engage the holding fingers 38 and maintain the flexible holding fingers of the upper element constantly and dynamically pushed against the wire coil. This effect occurs regardless of the coil varying width, but at the same time release the strand of wire being paid out with little attrition and no deformation.

Pressing parts 50 can be additionally added, inserted, glued, screwed or simply laid on top of the upper plate so as to retrofit existing retainers. They can be made from plastic or aluminum. In the embodiment shown in the drawings, pressing parts 50 are formed integrally with base element 32.

As an alternative, the pressing parts can be part of an additional upper retainer element having e.g. the shape of a plate, and which is placed on top of the upper element 40. The additional upper retainer element can have short projections pressing on the flexible holding fingers of the second plate.

A retainer according to a second embodiment of the invention is shown in FIGS. 11 to 15. For the features known from the previous embodiments, the same reference numerals are being used, and reference is made to the above explanations.

The most significant difference between the first and the second embodiment is that in the second embodiment, each of the holding fingers 38 has its "own" upper element 40. The holding fingers 38 are formed integrally with the upper elements 40 which serve for connecting the holding fingers 38 to the base element 32.

For connecting the holding fingers 38 via the upper elements 40 to the retainer, two holding ribs 60, 62 are provided on the base element 32, which extend transversely to the longitudinal direction of the guiding opening 42. The holding ribs are arranged so as to be displaced with respect to each other in a vertical direction, the inner holding rib 60 being arranged at the lower side of the base element 32 whereas the outer holding rib 62 being arranged at the upper side of the base element (please see in particular FIG. 13).

Figure 12:
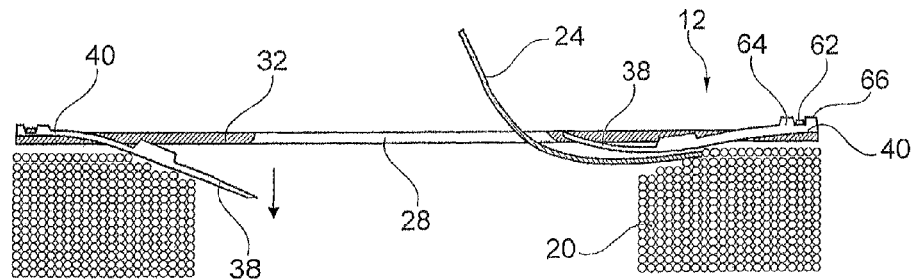
FIG. 12 shows a schematic cross section with the retainer according to the second embodiment in use.
Figure 11:
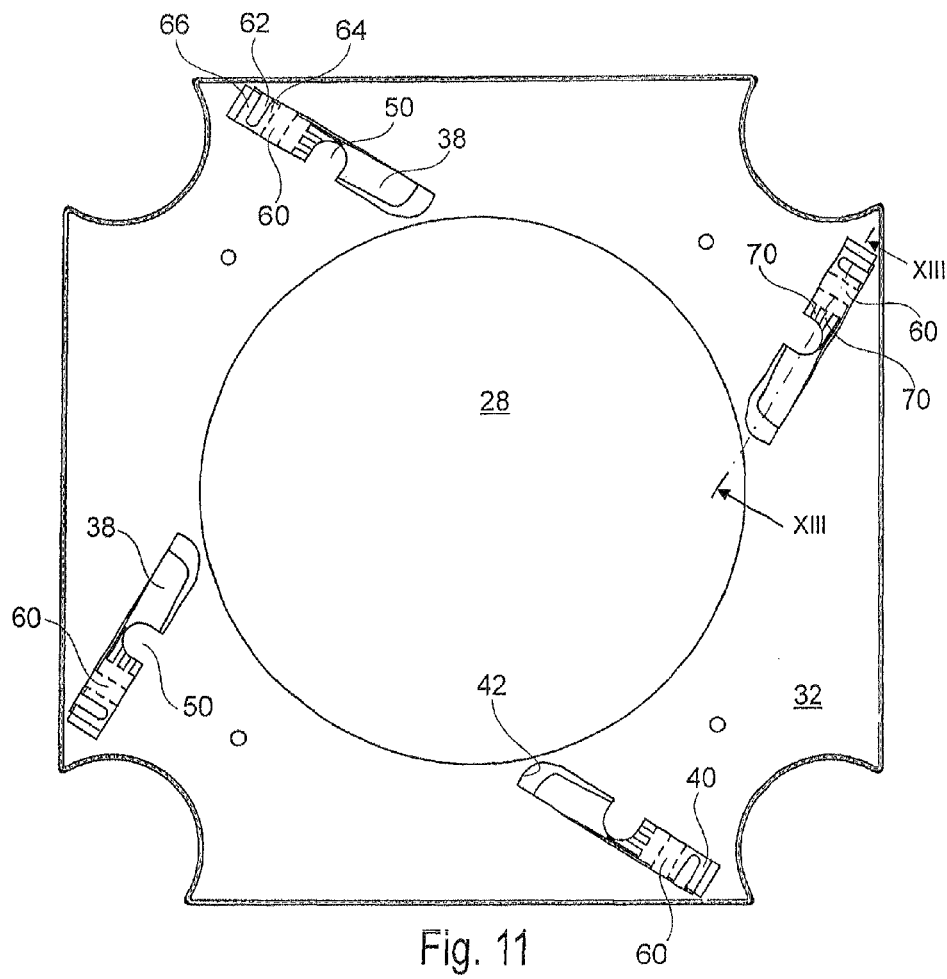
FIG. 11 shows a top view of the retainer according to a second embodiment of the invention.

The upper element 40 is provided with two positioning blocks 64, 66 which define between them a groove into which the outer holding rib 62 can engage (please see in particular FIG. 12).

Holding finger 38 is formed as a continuous extension of upper element 40. The element formed from the upper element and the holding finger is preferably formed from high quality rubber which ensures the required elasticity over long operating times. On the same side as the positioning blocks 64, 66 are arranged, holding finger 38 features a projecting, bump-like reinforcement 68 which is block-like with grooves 70 on its upper side. Provision of the grooves improves the elasticity and further saves material for forming the holding finger. Reinforcement 68 is arranged approximately half-way between the outer end of the upper element 40 and the free end of holding finger 38, and is adapted to cooperate with pressing part 50 formed on base element 32. The length of the holding finger 38 is chosen such that it, in a mounted condition, can be bent upwardly so as to dip with its free end into guiding opening 42 (please see FIG. 12; right holding finger).

The upper elements 40 together with their holding fingers 38 are mounted to the base element by clamping the upper element between the holding ribs 60, 62 and the upper surface of the retainer "behind" guiding opening 42 (please see FIG. 13 in which the holding finger together with the upper element 40 is schematically shown with a dashed line in a mounted condition). Pressing part 50, in co-operation with projecting reinforcement 68, presses holding finger 38 downwardly so that it extends towards the welding wire coil (please see in particular FIG. 12; left holding finger 38). When welding wire is being withdrawn, the welding wire pushes the holding finger 38 upwardly. The free end of the holding finger 38 can dip into the guiding opening 42 (please see FIG. 12, right holding finger) so that it does not obstruct welding wire withdrawal and ensures that the welding wire stays in contact with the rounded edge of the retainer surrounding central opening 28. In this condition, the central portion of the holding finger continues to be pressed downwardly, thereby maintaining a controlling effect on the welding wire coil.

According to a variant, a spring 80 (FIG. 13A) can be arranged between the holding finger 38 and the pressing part 50 for biasing the holding finger downwardly. As an additional variant or in combination with a spring or reinforcement 68, pressing part 50 can be formed with an increased thickness so as to protrude downwardly from the base element 32. This also allows to control the extent of the downwardly directed bias which is exerted on the holding finger 38.

The invention claimed is:

1. A retainer for a welding wire container, having a base element and at least one upper element which rests on the base element, the base element having a central opening for allowing the welding wire to pass through, and at least two guiding openings through which holding fingers extend, the holding fingers being part of the upper element and being made from a flexible material, wherein pressing parts are provided which act on the holding fingers so as to bend them downwardly, and wherein the pressing parts protrude downwardly from the base element.

2. The retainer of claim 1 wherein four guiding openings are provided which are evenly spaced in a peripheral direction.

3. The retainer of claim 2 wherein the length of the guiding opening is slightly larger than the length of the holding finger so that the free end of the holding finger can dip into the guiding opening.

4. The retainer of claim 1 wherein the pressing parts are formed integrally with the base element.

5. The retainer of claim 1 wherein a spring element is arranged between the pressing part and the holding finger.

6. The retainer of claim 1 wherein each of the holding fingers is provided with a projecting reinforcement which contacts an associated one of the pressing parts, the reinforcement being arranged between the free end of the holding finger and the upper element.

7. The retainer of claim 1 wherein the upper element is made from a flexible material, the holding fingers being formed integrally with the upper element.

8. A retainer for a welding wire container, having a base element and a plurality of separate upper elements, which rest on the base element, the base element having a central opening for allowing the welding wire to pass through, and at least two guiding openings through which holding fingers extended, each of the holding fingers being connected to one of the upper elements, and being made from a flexible material.

9. The retainer of claim 8 wherein each of the upper elements is clamped to the base element.

10. The retainer of claim 9 wherein each guiding opening features two holding ribs which extend transversely to the longitudinal direction of the guiding opening.

11. The retainer of claim 10 wherein each of the upper elements has two positioning blocks which cooperate with at least one of the holding ribs.

12. A container for welding wire, having a body, a welding wire coil contained in the body, and a retainer as claimed in claim 1, which sits on top of the welding wire coil so as to descend freely when the welding wire is being consumed, the retainer having a base element and at least one upper element which rests on the base element, the base element having a central opening for allowing the welding wire to pass through, and at least two guiding openings through which holding fingers extend, the holding fingers being part of the upper element and being made from a flexible material, the holding fingers interacting with the welding wire coil so as to control pay-out of the welding wire.

13. A retainer for a welding wire container, having a base element and at least one upper element which rests on the base element, the base element having a central opening for allowing the welding wire to pass through, and at least two guiding openings through which holding fingers extend, the holding fingers being part of the upper element and being made from a flexible material, wherein pressing parts are provided which act on the holding fingers so as to bend them downwardly, wherein each of the holding fingers is provided with a projecting reinforcement which contacts an associated one of the pressing parts, the reinforcement being arranged between the free end of the holding finger and the upper element.

14. The retainer of claim 13 wherein four guiding openings are provided which are evenly spaced in a peripheral direction.

15. The retainer of claim 14 wherein the length of the guiding opening is slightly larger than the length of the holding finger so that the free end of the holding finger can dip into the guiding opening.

16. The retainer of claim 13 wherein the pressing parts are formed integrally with the base element.

17. The retainer of claim 13 wherein a spring element is arranged between the pressing part and the holding finger.

18. The retainer of claim 13 wherein the upper element is made from a flexible material, the holding fingers being formed integrally with the upper element.

19. A container for welding wire, having a body, a welding wire coil contained in the body, and a retainer as claimed in claim 13, which sits on top of the welding wire coil so as to descend freely when the welding wire is being consumed, the retainer having a base element and at least one upper element which rests on the base element, the base element having a central opening for allowing the welding wire to pass through, and at least two guiding openings through which holding fingers extend, the holding fingers being part of the upper element and being made from a flexible material, the holding fingers interacting with the welding wire coil so as to control pay-out of the welding wire.

20. A retainer for a welding wire container, having a base element and a plurality of separate upper elements which rest on the base element, the base element having a central opening for allowing the welding wire to pass through, and at least two guiding openings through which holding fingers extend, each of the holding fingers being connected to one of the upper elements, being made from a flexible material, wherein each of the upper elements is clamped to the base element, and wherein each guiding opening features two holding ribs which extend transversely to the longitudinal direction of the guiding opening.

21. The retainer of claim 20 wherein four guiding openings are provided which are evenly spaced in a peripheral direction.

22. The retainer of claim 21 wherein the length of the guiding opening is slightly larger than the length of the holding finger so that the free end of the holding finger can dip into the guiding opening.

23. The retainer of claim 20 wherein pressing parts are provided which act on the holding fingers so as to bend them downwardly.

24. The retainer of claim 23 wherein the pressing parts are formed integrally with the base element.

25. The retainer of claim 23 wherein the pressing parts protrude downwardly from the base element.

26. The retainer of claim 23 wherein a spring element is arranged between the pressing part and the holding finger.

27. The retainer of claim 23 wherein each of the holding fingers is provided with a projecting reinforcement which contacts an associated one of the pressing parts, the reinforcement being arranged between the free end of the holding finger and the upper element.

28. The retainer of claim 23 wherein the holding fingers being formed integrally with the upper element.

29. The retainer of claim 20 wherein each of the upper elements has two positioning blocks which cooperate with at least one of the holding ribs.

30. A container for welding wire, having a body, a welding wire coil contained in the body, and a retainer as claimed in claim 20, which sits on top of the welding wire coil so as to descend freely when the welding wire is being consumed, the retainer having a base element and at least one upper element which rests on the base element, the base element having a central opening for allowing the welding wire to pass through, and at least two guiding openings through which holding fingers extend, the holding fingers being part of the upper element and being made from a flexible material, the holding fingers interacting with the welding wire coil so as to control pay-out of the welding wire.

31. A retainer for a welding wire container, having a base element and at least one upper element which rests on the base element, the base element having a central opening for allowing the welding wire to pass through, and at least two guiding openings through which holding fingers extend, the holding fingers being part of the upper element and being made from a flexible material, wherein the length of the guiding opening is slightly larger than the length of the holding finger which is short enough so that the free end of the holding finger can retract upwardly into the guiding opening.

32. The retainer of claim 31 wherein four guiding openings are provided which are evenly spaced in a peripheral direction.

33. The retainer of claim 31 wherein pressing parts are provided which act on the holding fingers so as to bend them downwardly.

34. The retainer of claim 33 wherein the pressing parts are formed integrally with the base element.

35. The retainer of claim 33 wherein the pressing parts protrude downwardly from the base element.

36. The retainer of claim 33 wherein a spring element is arranged between the pressing part and the holding finger.

37. The retainer of claim 33 wherein each of the holding fingers is provided with a projecting reinforcement which contacts an associated one of the pressing parts, the reinforcement being arranged between the free end of the holding finger and the upper element.

38. The retainer of claim 33 wherein the upper element is made from a flexible material, the holding fingers being formed integrally with the upper element.

39. A container for welding wire, having a body, a welding wire coil contained in the body, and a retainer as claimed in claim 31, which sits on top of the welding wire coil so as to descend freely when the welding wire is being consumed, the retainer having a base element and at least one upper element which rests on the base element, the base element having a central opening for allowing the welding wire to pass through, and at least two guiding openings through which holding fingers extend, the holding fingers being part of the upper element and being made from a flexible material, the holding fingers interacting with the welding wire coil so as to control pay-out of the welding wire.

* * * * *

UNITED STATES PATENT AND TRADEMARK OFFICE
CERTIFICATE OF CORRECTION

| | | |
|---|---|---|
| PATENT NO. | : 8,235,211 B2 | Page 1 of 1 |
| APPLICATION NO. | : 12/917320 | |
| DATED | : August 7, 2012 | |
| INVENTOR(S) | : Carlo Gelmetti | |

It is certified that error appears in the above-identified patent and that said Letters Patent is hereby corrected as shown below:

Title Page, add (63) Related Application Data "Continuation-in-part of application No. 12/545,720, filed August 21, 2009".

Signed and Sealed this
Eighteenth Day of December, 2012

David J. Kappos
*Director of the United States Patent and Trademark Office*